US012561531B2

(12) United States Patent (10) Patent No.: US 12,561,531 B2
Gupta et al. (45) Date of Patent: Feb. 24, 2026

(54) METHOD AND SYSTEM FOR AUTOMATED SENTIMENT CLASSIFICATION

(71) Applicant: CONDUENT BUSINESS SERVICES, LLC, Florham Park, NJ (US)

(72) Inventors: Ambrish Gupta, Karnataka (IN); Niraj Kumar, Karnataka (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 292 days.

(21) Appl. No.: 17/718,839

(22) Filed: Apr. 12, 2022

(65) Prior Publication Data

US 2023/0325604 A1 Oct. 12, 2023

(51) Int. Cl.
　　*G10L 25/63* (2013.01)
　　*G06F 40/20* (2020.01)
　　*G06F 40/35* (2020.01)

(52) U.S. Cl.
　　CPC .............. *G06F 40/35* (2020.01); *G06F 40/20* (2020.01); *G10L 25/63* (2013.01)

(58) Field of Classification Search
　　CPC ................................. G10L 25/63; G06F 40/20
　　See application file for complete search history.

(56) References Cited

U.S. PATENT DOCUMENTS 8,463,595 B1 6/2013 Rehling et al.
9,105,042 B2 8/2015 Sylves 9,460,083 B2 10/2016 Fink et al.
11,501,794 B1 * 11/2022 Kim ..................... G10L 15/1815
2022/0210021 A1 * 6/2022 Sinkar ................. H04L 43/0876
2023/0154457 A1 * 5/2023 Eyben ..................... G10L 15/22
704/244

OTHER PUBLICATIONS

Akhtar et al. "All-in-one: emotion, sentiment and intensity prediction using a multi-task ensemble framework." IEEE Transactions on Affective Computing 13:1:285-297 (2019).
Bahdanau et al., "Neural machine translation by jointly learning to align and translate." arXiv preprint arXiv:1409.0473 (2014).
Hochreiter & Schmidhuber, "Long short-term memory." Neural Computation 9:8:1735-1780 (1997).
(Continued)

*Primary Examiner* — Thomas H Maung
(74) *Attorney, Agent, or Firm* — Jones Burke PLLC

(57) ABSTRACT

A system includes an input interface receiving conversation input from at least one system participant. A natural language processor operates on the conversational input. A sentiment processor operates on the pre-processed input using a sentiment classification model to predict sentiment, the sentiment processor predicting positive, neutral, and negative sentiment for the pre-processed input. An emotion processor receiving the pre-processed input from the natural language processor and a corresponding sentiment from the sentiment processor and operates to predict an emotion class and a strength of the emotion based on the corresponding sentiment. An output mechanism generates sentiment strength for the conversation input based on the emotion class and strength of the emotion.

20 Claims, 10 Drawing Sheets

(56) References Cited

OTHER PUBLICATIONS

Hutto & Gilbert, "Vader: A parsimonious rule-based model for sentiment analysis of social media text." Proceedings of the International AAAI Conference on Web and Social Media. 8:1:216-225 (2014).

Loria, Steven, "textblob Documentation." Release 0.16.0 2:269 (Apr. 26, 2020).

Pennington et al., "GloVe: Global Vectors for Word Representation." Proc. of the 2014 Conf. on Empirical Methods in Natural Language Processing (EMNLP) pp. 1532-1543 (Oct. 25-29, 2014).

Riloff & Wiebe, "Learning extraction patterns for subjective expressions." Proceedings of the 2003 Conference on Empirical Methods in Natural Language Processing (2003).

Sing et al., "Development of a novel algorithm for sentiment analysis based on adverb-adjective-noun combinations." 2012 3rd National Conf on Emerging Trends and Applications in Computer Science. IEEE (2012).

Sutskever et al., "Sequence to Sequence Learning with Neural Networks" Advances in Neural Information Processing Systems 27:1-9 (2014).

Yang et al. "Hierarchical Attention Networks for Document Classification" Proc of the 2016 Conf of the North American Chapter of the Association for Computational Linguistics: Human Language Technologies (NAACL-HLT) pp. 1480-1489 (Jun. 12-17, 2016).

Zhang et al., "Deep Learning for Sentiment Analysis: A Survey" Wiley Interdisciplinary Reviews: Data Mining and Knowledge Discovery 8.4:e1253 (2018).

* cited by examiner

500

RECEIVE SPEECH AT INPUT INTERFACE
510

USE NLP TO PRODUCE TEXT UTTERANCES
520

OPERATE ON UTTERANCES WITH
SENTIMENT PROCESSOR
530

OPERATE ON TEXT WITH EMOTION
PROCESSOR
540

OUTPUT SENTIMENT STRENGTH BASED
ON OUTPUT FROM SENTIMENT
PROCESSOR AND EMOTION PROCESSOR
550

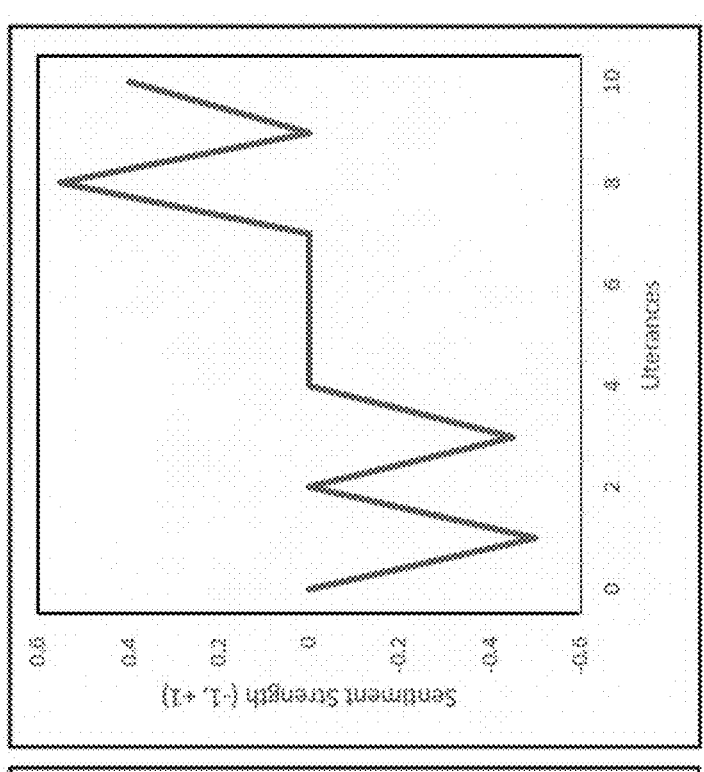

Agent: 'How are you?'
User: 'I am really suffering with your credit card system, it is not working. Even your service is too poor. It seems you people are not maintaining your service quality. I didn't get any response for my last call.'
Agent: 'I am very sorry for that. Tell me the details.'
User: 'I tried online purchase, since after that it is not working.'
Agent: 'Let me check. It seems, you had pressed the button without entering the pin, as system shows three wrong password entries. So, blocked for one day.'
User: 'Now, how can I activate my card again?'
Agent: 'It is easy. Go to the nearest bank branch and submit the request for with ID proof documents.'
User: 'Is there any other way to solve it?'
Agent: 'I suggested the best solution to you. It will work for you. Any other question?'
User: 'No. Thanks for solving my issues.'

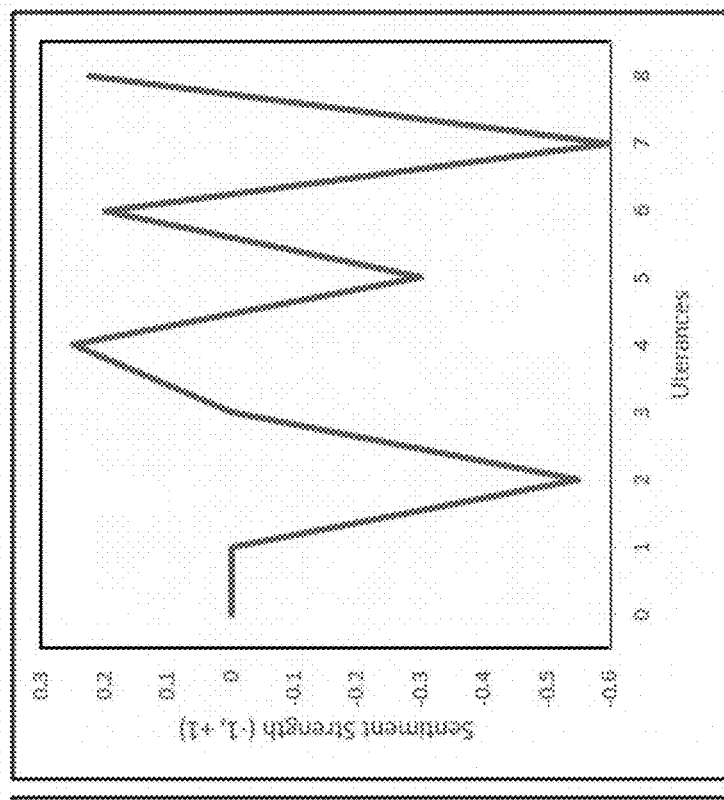

Agent: 'Hi. How can I help you?'

User: 'Since long time our investment growth is negative. It shows only downfall. I lost 30 percent of the money I had invested. This is totally different from your advertisement claims.'

Agent: 'Actually, once market conditions improve, you will start getting the benefit. Now you are able to buy more shares at less price.'

User: 'Why my money not invested in good companies? I can see growth in a lot of shares. Are you people getting any benefit for investing money in any company?'

Agent: 'No, we give high importance to our customers. We select companies based on a lot of parameters.'

User: 'I cannot fully trust on your answer. How you missed a lot of companies showing better performance.'

Agent: 'You should believe in our expert's quality. You will get benefit in the long run.'

User: 'Now I feel afraid in believing you people.'

Agent: 'Don't worry, the situation will be ok.'

Input text: 'I will sue you',

Model output:

{'original_text': 'I will sue you',
'sentiment': 'Negative',
'sentiment_magnitude': '0.64681286',
'emotion_anger': '0.64681286',
'emotion_fear': '0.0',
'emotion_joy': '0.0',
'emotion_sad': '0.0'}

METHOD AND SYSTEM FOR AUTOMATED SENTIMENT CLASSIFICATION

TECHNICAL FIELD

Aspects of the disclosure are related to quantitative analysis of sentiment, while also incorporating emotion classification.

BACKGROUND

Many technological organizations have introduced tools for enhancing communication skills of employees. In particular, organizations have introduced tools for analyzing communication to determine whether it is effective and achieves its targeted goals. For example, in a call center environment, tools have been introduced for analyzing participant sentiment in order to evaluate whether a problem has been effectively solved. In addition to call centers, online chat platforms are also utilized for performing conversational functions. Thus, conversations can either be in the form of text or voice-based speech.

Sentiment and emotion analysis is a very important component of systems for evaluating conversational data for businesses. Conversation contains huge variations in size, talkative content, topics of discussion, and context. It also tends to have misspellings, slang terms, shortened forms of words, and incomplete text. This adds to the additional complexity for sentiment and emotion identification. Further, traditional off-the-shelf sentiment analysis often fails to perform accurately enough in the context of conversations. Many available systems fail to adequately capture the above-described scope of variation and therefore do not analyze conversational data to a level of accuracy sufficient for call center businesses.

Additionally, traditional systems often cannot accurately distinguish between neutral and other sentiments and hence, conversational data is often mistakenly identified as neutral. Existing approaches fail to factor in the emotion while determining the overall sentiment. Most existing models implement emotion and sentiment classifiers as independent blocks that do not work together. Sentiment analysis based on textual content can appear neutral when emotion is not incorporated in the analysis. However, once emotion is factored in, the sentiment could in fact be evaluated as negative or positive.

Further, traditional unweighted sentiment analysis often fails to fulfill business requirements as it does not rank text segments with negative and positive sentiments. Thus, all the resultant negatively classified texts show equal priorities, and the same happens with the positively classified texts. The lack of priority information results in heavy manual effort in handling the data. For example, suppose a company receives ten million negative comments. In this case, we cannot say that these negative comments are equally negative or they will have an equally negative impact on the company. There may be some percentages of the highly negative comments, which may result in a commercial loss if a customer problem has not been solved.

Further, most models determine sentiment based on overall text in a session of conversation and not necessarily segments (utterances) of a conversation. The failure to capture sentiment of individual utterances results in unsatisfactory analysis as it is unknown which parts of the conversational data result in the evaluation of the conversation as having a negative or positive sentiment.

Previous sentiment classification systems often rely on the bag-of-words model, which disregards context, grammar and even word order. Existing models identify frequently occurring templates and patterns in sentences. Most determine sentiment based on overall text in a session of conversation and not necessarily segments (utterances) of a conversation. This approach ignores that fact that within the same session sentiment/emotion could vary for example from negative at the beginning to very positive at the end.

Accordingly, a solution is needed for evaluating conversational sentiment that incorporates an emotion analysis and further considers individual utterances in order to add value to the sentiment analysis. The implemented system should identify satisfaction through sentiment classification in real time, avoiding the need to wait for survey results.

SUMMARY

According to embodiments illustrated herein, a sentiment classification system is provided for enhancing conversational effectiveness of a system participant. In an embodiment, a system is provided including an input interface receiving conversational input from at least one system participant. The system further includes a natural language processor operating on the input to produce pre-processed text and a sentiment processor operating on the pre-processed text using a sentiment classification model to predict sentiment, the sentiment processor predicting positive, neutral, and negative sentiment for the text. The system further includes an emotion processor receiving the pre-processed text from the natural language processor and a corresponding sentiment from the sentiment processor. The emotion processor operates on the text to predict an emotion and a strength of the emotion based on the corresponding sentiment. An output mechanism is provided for generating sentiment strength for the text based on the emotion and strength of the emotion. Further, in embodiments provided herein, the output mechanism generates sentiment strength for multiple utterances throughout a dialog in order to dynamically generate a representation of the sentiment strength throughout the dialog.

According to further embodiments described herein, a method is provided for sentiment classification. The method includes receiving conversational input at an input interface from at least one system participant and operating on the conversational input using a natural language processor to produce pre-processed text. The method additionally includes predicting sentiment using a sentiment processor operating on the pre-processed text, the sentiment processor using a sentiment classification model for predicting positive, neutral, and negative sentiment for the pre-processed text. The method additionally includes predicting an emotion and a strength of the emotion of the pre-processed text received from the natural language processor using an emotion pre-processed text received from the natural language processor using an emotion processor receiving the pre-processed text from the natural language processor and a corresponding sentiment from the sentiment processor. The method additionally includes generating sentiment strength for the text based on the emotion and strength of the emotion.

In yet a further embodiment, a computer program product is provided for use with a computer. The computer program product includes computer readable program code embodied thereon for evaluating and enhancing conversational effectiveness. The computer readable code includes program instructions for operating on the conversational input that, when executed by a computer perform the method described above.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. In a few examples, one element may be designed as multiple elements or multiple elements may be designed as one element. In a few examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIG. 7 is a graph illustrating sentiment classification output in accordance with at least one embodiment;

FIG. 8 is a graph illustrating an alternative sentiment classification output in accordance with at least one embodiment.

DETAILED DESCRIPTION

Figure 1:
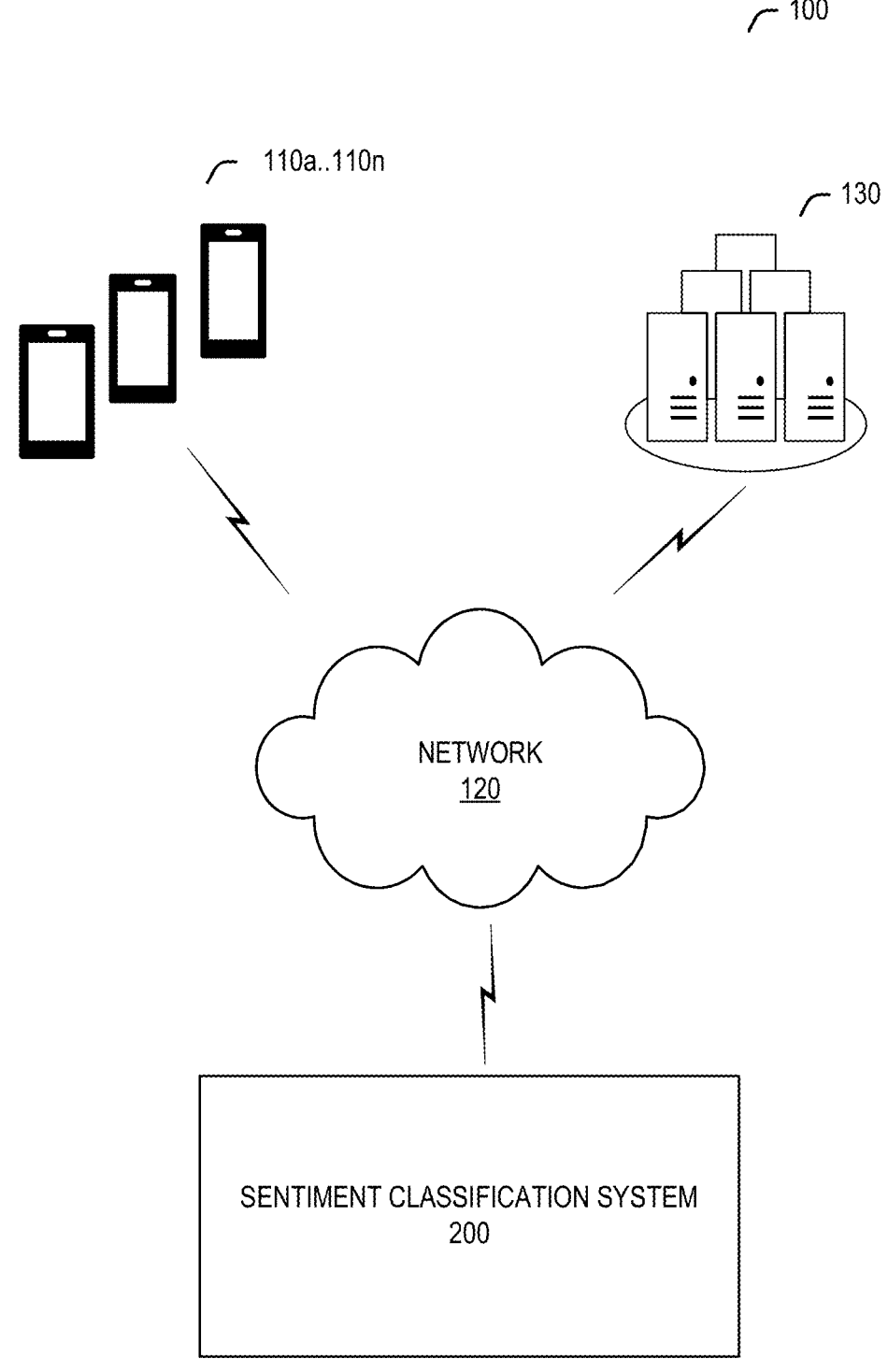
FIG. 1 is a block diagram illustrating an operating environment for a sentiment classification system in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are for explanatory purposes, as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Embodiments of the invention are directed to a framework for sentiment classification designed for measuring and enhancing speech or conversational effectiveness of a system participant. Additionally, the system defines a sentiment flow based on conversational input throughout a conversation or dialogue.

Sentiment analysis is the use of natural language processing, text analysis, computational linguistics, and biometrics to systematically identify, extract, quantify, and study affective states and subjective information. Sentiment analysis is widely applied to customer or client materials such as reviews and survey responses, online and social media and also to customer service platforms.

Embodiments disclosed herein incorporate emotion classification within a sentiment classifier in order to more accurately gauge sentiment and reduce the incidence of a false neutral result. Emotions can be defined as responses to significant internal and external events. Although numerous emotions exist, basic emotions are limited. For conversation data, emotions are more granular measurement than sentiment. Further, some emotions play an important role in determining customer satisfaction and others do not. Accordingly, disclosed embodiments incorporate those emotions playing an important role into the sentiment classification system.

Embodiments disclosed herein include three learning based models. These include a sentiment classifier model and two emotion models. One emotion model quantifies positive emotion and the other quantifies negative emotion. Quantification is performed on an utterance level on preprocessed text data. Embodiments disclose herein quantify sentiment in two stages. A first stage utilizes a sentiment classifier and the second stage uses the corresponding emotion classifier and provides the emotion class and emotion strength. As a conversation consists of a sequence of utterances, the proposed system provides sentiment and emotion flow over the full conversation. This sentiment flow is further used for overall sentiment and quality of conversation. The proposed method and system outperform previously existing models and are highly generalizable.

Thus, embodiments disclosed herein focus on the development of a highly dynamic system equipped with easy domain adaptation for different domains. The three deep learning architecture including the sentiment classifier and two emotion classifiers is built on open source informal text. All three models are used in combination. Thus, sentiment classification of conversation data can be accomplished at an utterance level in two stages. The first stage uses the sentiment model based on predicted sentiment class and strength, and the second stage uses the corresponding emotion model and provides the emotion class and emotion strength. As a conversation consists of a sequence of utterances, the proposed system provides the sentiment and emotion flow over the full conversation. This sentiment flow is further used for overall sentiment, emotion, and quality of conversation.

FIG. 1 is a block diagram illustrating an operating environment 100 for a system for sentiment classification in accordance with at least one embodiment. The system defines sentiment based on the performance of the system participants in order to dynamically produce sentiment output over the course of dialogue. Multiple participant systems 110*a* . . . *n* may be connected over a network 120 to servers 130 and a sentiment classification system 200

The participant systems 110*a* . . . *n* may be operated by an individual seeking service or problem resolution through the servers 130. The participant system may be or include a computing device such a laptop or desktop computer, a tablet, a personal digital assistant (PDA), or a mobile phone. Other participants systems may also be incorporated.

The network 120 may include a wired or wireless local area network (LAN) and a wide area network (WAN), wireless personal area network (PAN) and other types of networks. Although only one network is shown, the computers may be connected over multiple disparate networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The sentiment classification system 200 includes a computing system implementing multiple models, which may, for example, include neural networks in order to measure and classify sentiment throughout a dialogue. In embodiments of the invention, the system operates in a customer service environment, such that participants operate the participant systems 110 to interact with the servers 130. The sentiment classification system 200 may receive input from the participant systems 110 and the servers 130 in order to classify sentiment of all participants throughout a dialogue.

In embodiments set forth herein, the servers 130 represent a customer service platform, which may include, for example, a call center or an online chat environment operated by an organization providing customer service. The sentiment classification system 200 is further illustrated in FIG. 2 and as will be described below, operates by using multiple models to classify sentiment through the course of a dialog.

Figure 2:
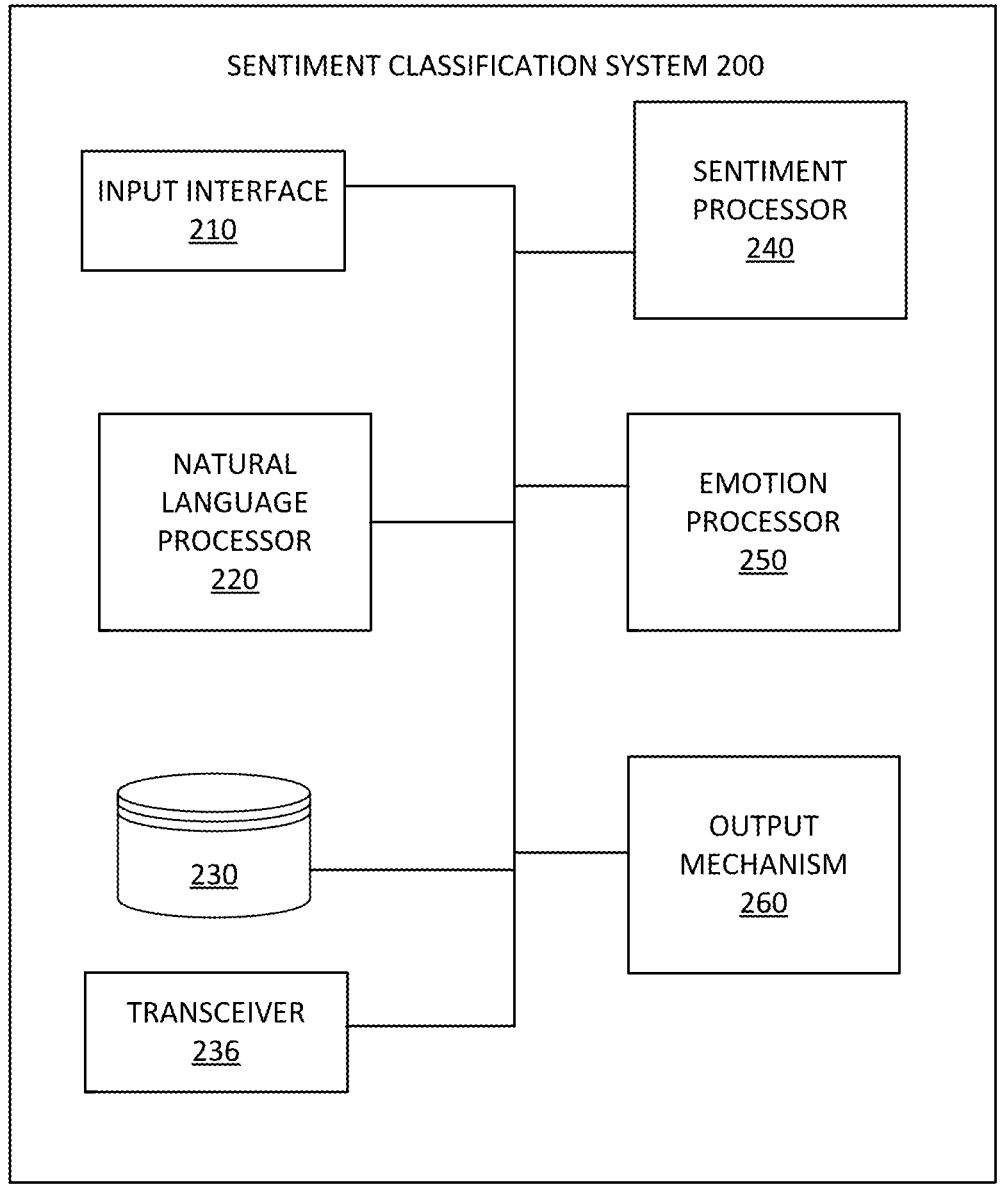
FIG. 2 is a block diagram illustrating a sentiment classification system in accordance with at least one embodiment.

FIG. 2 is a block diagram illustrating the sentiment classification system 200 for providing sentiment output throughout the course of a dialogue in accordance with at least one embodiment. The embodiment of the system 200 as shown includes an input interface 210, a natural language processor (NLP) 220, a memory 230, a transceiver 236, a sentiment processor 240, an emotion processor 250, and an output mechanism 260.

The memory 230 is configured to store a set of instructions or modules. Some of the commonly known memory implementations can be, but are not limited to, a Random-Access Memory (RAM), a Read-Only Memory (ROM), a Hard Disk Drive (HDD), and a secure digital (SD) card. The memory 230 may include a program module and program data. The program module includes a set of instructions that can be executed by the processors to perform specific actions on the system 200. The data may be stored in various databases present in the memory 230 that are accessible to the processors executing the stored programs. Databases stored in the memory 230 can be implemented by using several technologies that are well known to those skilled in the art. Some examples of technologies may include, but are not limited to, MySQL® and Microsoft SQL®. In an embodiment, the databases may be implemented as cloud storage. Examples of cloud storage may include, but are not limited to, Amazon E3® and Hadoop® distributed file system. The memory 230 may also store databases including, for example, an utterance log.

The transceiver 236 may include logic, circuitry, interface, and/or code operable to communicate with one or more devices, such as the participant system 110, servers 130 or any other devices that may be included in the environment 100. The transceiver 236 may implement one or more known technologies to support wired or wireless communication with the communication network 120. In embodiments of the invention, the transceiver 236 may be coupled to the I/O mechanisms 210 and 260 through which the transceiver 236 may receive or transmit instructions, queries, speech signals or other information. The transceiver 236 may include, but is not limited to, an antenna, a radio frequency (RF) transceiver, one or more amplifiers, a tuner, one or more oscillators, a digital signal processor, a universal serial bus (USB) device, a coder-decoder (CODEC) chipset, a subscriber identity module (SIM) card, and/or a local buffer. The transceiver 236 may communicate via wireless communication with networks such as the Internet, an Intranet and/or wireless network, such as a cellular telephone network, a wireless local area network (LAN) and/or a metropolitan network (MAN).

The input and output (I/O) mechanisms 210 and 260 may include multiple mechanisms for receiving conversational input including speech or text input and generating both speech output and other types of feedback reviewable by the system participant utilizing the participant system 110. The I/O mechanisms 210 and 260 may comprise suitable logic, circuitry, interfaces, and/or code that may be configured to transmit or receive a speech signal or other information to and from devices such as the participant system 110 over the network 120. The I/O mechanisms 210, 260 may be configured to communicate with the transceiver 236 and may be connected to the communication network 120 through the transceiver 236. The I/O mechanisms 210, 260 may further include an input terminal and an output terminal that may be realized through an antenna, and Ethernet port, a USB port, or any other type of port that may be configured to receive and transmit data. The I/O interfaces 210, 260 may include, but is not limited to, a keyboard, a mouse, a joystick, a touch screen, a touch pad, a microphone, a camera, a motion sensor, and/or a light sensor. Further, the I/O mechanisms 210, 260 may include a display screen realized using suitable logic, circuitry, code, and/or interfaces that may be operable to display output. The display screen may be or include but is not limited to a liquid crystal display (LCD) display, light emitting diode (LED) display, or an organic LED (OLED) display.

The NLP 220 operates on input speech or text to derive syntax capable of analysis. The NLP 220 is connected with the input interface 210 and operates on captured conversational data to perform an audio to text conversion and/or text pre-processing and processing. In order to accomplish the text processing, the NLP 220 utilizes algorithms to identify and extract rules such that the unstructured data can be converted to text to be analyzed. For example, the NLP 220 may perform speech recognition, speech segmentation, sentiment analysis, topic segmentation and recognition, word sense disambiguation, and any other operations necessary to facilitate the analysis necessary for utilizing the framework described herein. The NLP 220 may include suitable logic, circuitry, and/or code that may be configured to execute instructions stored in the memory 230. The NLP 220 may be implemented based on a number of processor technologies that include, but are not limited to an X-86 based processor, a reduced instruction set computing (RISC) processor, an application-specific integrated circuit (ASIC) processor, a couples set computing (CISC) processor, a microprocessor, a microcontroller, or other suitable structures. Code integrated with the NLP 220 may include python source code or another suitable type of code.

The sentiment processor 240 and the emotion processor 250 may include trained neural networks that execute processing to operate in combination in order to provide sentiment classification and measurement throughout the course of input dialogue. The sentiment processor 240 and emotion processor 250 evaluate the processed conversation output by NLP 220 based on a stored framework. The sentiment processor 240 and emotion processor 250 may also operate on unprocessed speech received through the transceiver 236 and input interface 210 to analyze factors such as loudness, pitch, and speech rate. The sentiment processor 240 and emotion processor 250 may implement known processing hardware as described above and utilize code that defines the framework as set forth herein.

Each of the processors described above can be utilized to implement multiple discrete software modules performing each of the functions described herein. Processors can be realized through a number of processor technologies known in the art. Examples of the processor can be an X86 processor, a RISC processor, an ASIC processor, a CISC processor, or any other processor. Furthermore, although a single memory structure is shown, multiple memory structures may be included. Multiple processors are shown but can be combined into fewer processors if desired. The processors are configured to execute sets of instructions stored in the memory 200. The processors gather the sets of instructions from the memory and execute the sets of instructions.

Figure 3:
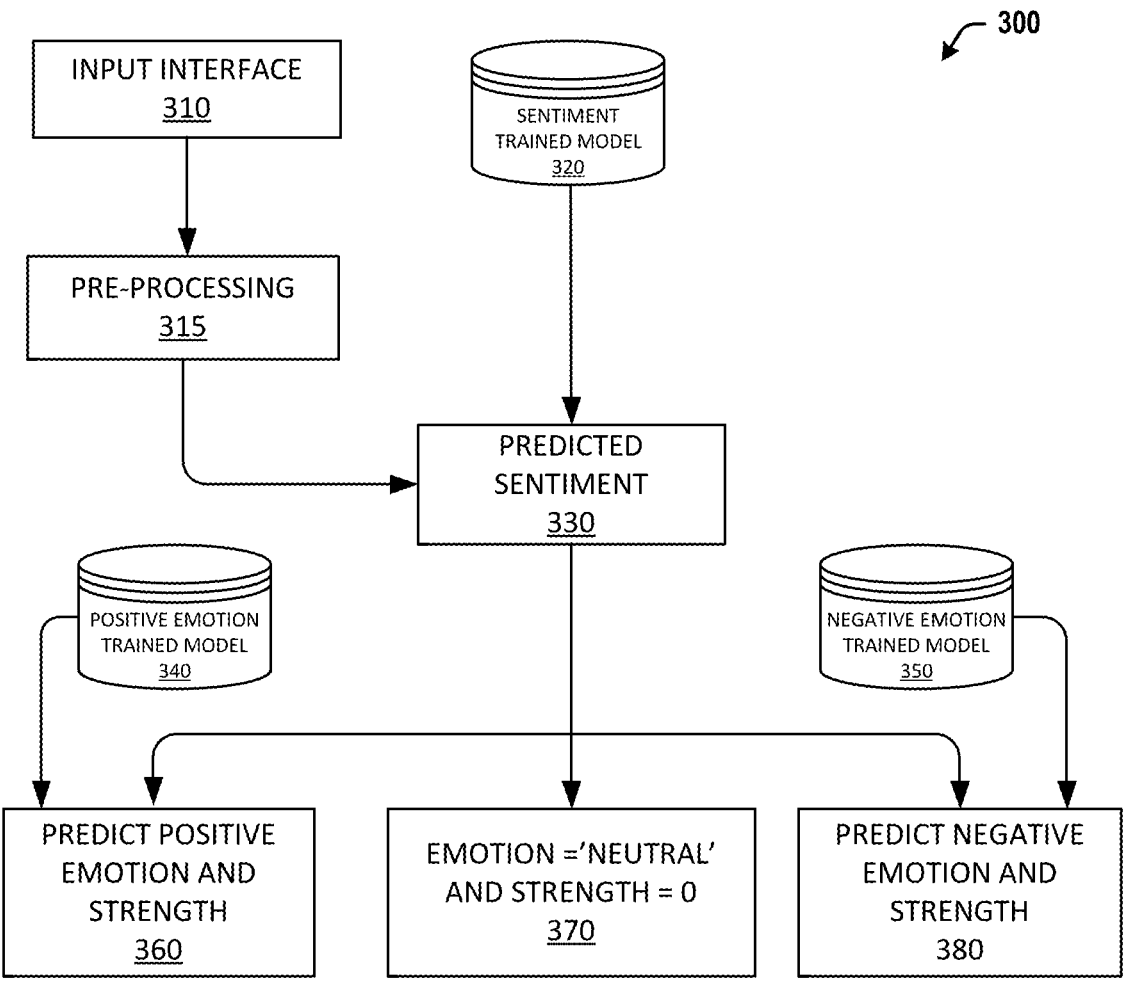
FIG. 3 is a flow diagram illustrating process flow for a sentiment classification system in accordance with at least one embodiment.

FIG. 3 is a flow diagram illustrating process flow for sentiment classification such as that performed by sentiment classification system 200 in accordance with at least one embodiment.

At 310, the input interface such as input interface 210 shown in FIG. 2 receives conversational input. The conversational input received can be either in the form of text (like chat) or voice based (via conversational speech). Conversational data consists of sequence of dialogue (utterances) between participant systems and call center or online chat agents (servers 130). Each utterance can vary in length from one word to a few sentences.

Using pre-processing at 315, conversational speech is converted to text using speech-to-text services. Conversation contains huge variations in size, talkative content, topics of discussion, and context. It also tends to have misspellings, slang terms, shortened forms of words, and incomplete text. These issues are identified and resolved during pre-processing 315. Pre-processing may include, for example, remove the following characters: |: , ; & !?. Preprocessing may further include converting to lowercase and stemming, to reduce word inflections and removing any tokens with a document frequency less than two, which reduces sparse features that are not informative for learning.

Three models, including a sentiment trained model or classifier 320, a positive emotion trained model or classifier 340 and a negative emotion trained model or classifier 350 receive the pre-processed input conversation. The sentiment trained model 320 operates on the pre-processed conversation to produce a predicted sentiment at 330. The predicted sentiment 330 may include predicted sentiment class and strength. The predicted sentiment may be positive, negative, or neutral. The predicted sentiment, when positive, is forwarded to the positive emotion trained model and when negative, is forwarded to the negative emotion trained model.

The positive emotion trained model operates on the pre-processed conversation at 340 to predict positive emotion and strength at 360. The negative emotion trained model 350 operates on the pre-processed conversation to predict negative emotion and strength at 380. In some instances, the predicted sentiment and emotion will result in a neutral conclusion at 370. The emotion trained models 340 and 350 may predict emotion class and emotion strength.

Thus, as illustrated in FIG. 3, prediction of sentiment for conversation data can be accomplished at the utterance level in two stages. The first stage uses the sentiment model based on predicted sentiment class and strength, and the second stage uses the corresponding emotion model and provides the emotion class and emotion strength. If length of utterance is more than maximum length (hyper parameter) of input layer, then utterances are split into sentence and aggregate of sentiment and emotion score of sentences are used as utterance level score.

The negative sentiment of any text belongs to a large number of negative emotions. Similarly, positive-sentiment also belongs to a large number of positive emotions. As emotion is more granular than sentiment, the illustrated process flow utilizes an emotions model for sentiment classification. Some of these emotions play an important role in customer satisfaction chat and call analytics. Other emotions may not play an important role in the quantification. Useful emotions may belong to four strong emotion classes including: anger, fear, sadness, and joy. Based on these observations, the sentiment classification system is designed to quantify the revenue-oriented chat and call analytics data into negative, positive, and neutral data by using a weighted rule of these four emotion classes.

Figure 4A:
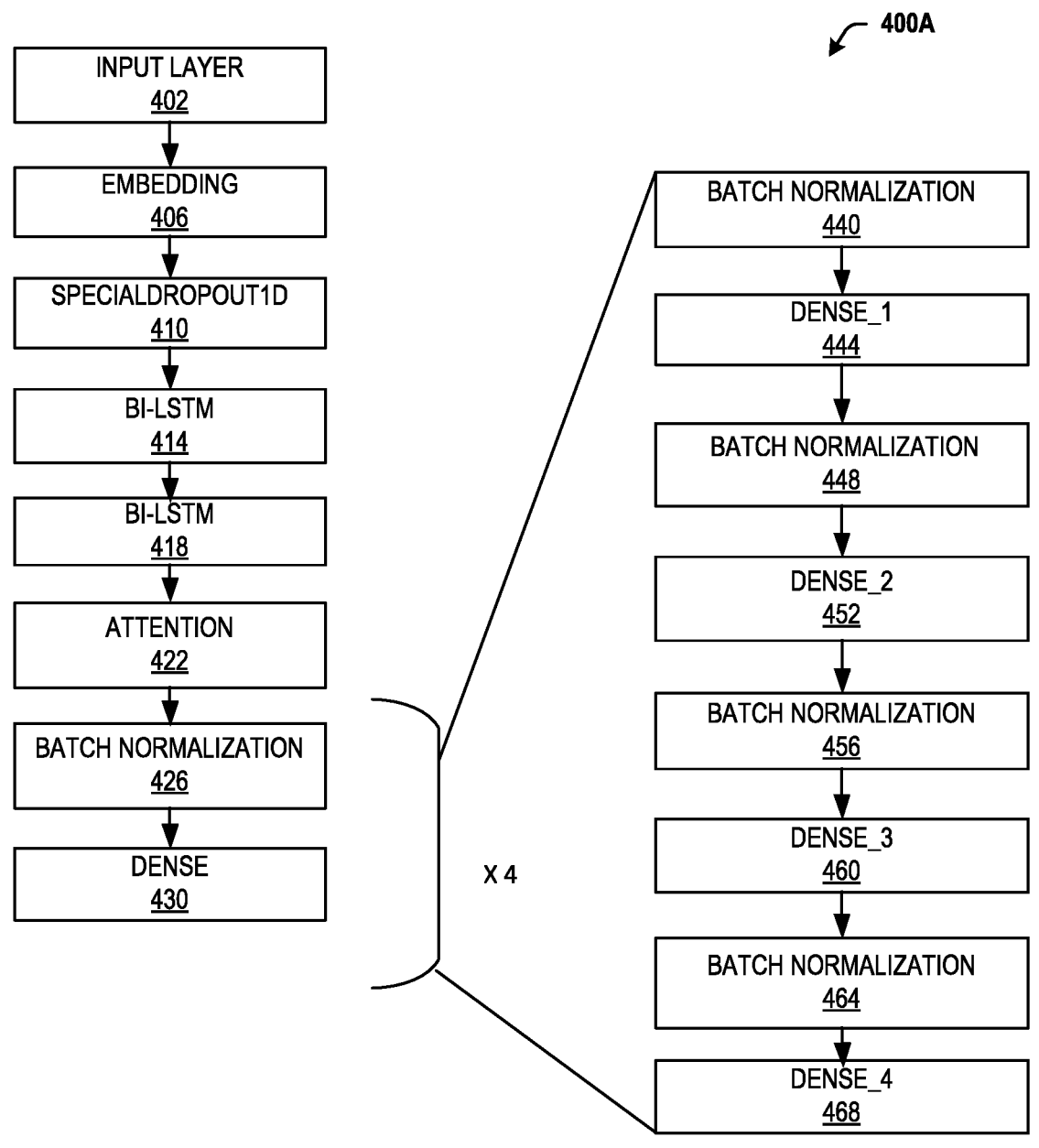
FIGS. 4A and 4B are block diagrams illustrating a sentiment classifier model and an emotion classifier model in accordance with at least one embodiment.

FIG. 4A is a block diagram illustrating a sentiment classifier model 400A in accordance with an embodiment. The sentiment classifier model 400 is based on a deep learning architecture using a variant of the Long Short term Memory (LSTM) model which successfully accomplishes many natural language processing tasks. Long short-term memory (LSTM) is an artificial recurrent neural network (RNN) architecture used in the field of deep learning. Unlike standard feedforward neural networks, LSTM has feedback connections. It can process not only single data points, but also entire sequences of data, such as speech input.

Initially, an input layer 402 includes pre-processed text. Pre-processing is applied to each utterance to normalize content and create the input layer. Pre-processing may include, for example, removing the following characters: |: , ; & !?. Preprocessing may further include converting to lowercase and stemming, to reduce word inflections and removing any tokens with a document frequency less than two, which reduces sparse features that are not informative for learning. After preprocessing, each word is transformed into a word embedding vector at 406 of three hundred dimension, for example using Glove pre-trained vectors.

At 410, a 1D spatial dropout layer is applied. Dropout refers to ignoring units or neurons during the training phase of certain set of neurons which is chosen at random. That is, these neurons are not considered during a particular forward or backward pass. For 1D spatial dropout, an entire 1D feature map is dropped instead of individual units.

To capture the context of each word, the sentiment classifier model 400 uses two bidirectional LSTM layers at 414 and 418. Bidirectional long-short term memory (Bidirectional LSTM) is the process of making any neural network have the sequence information in both directions backwards (future to past) or forward (past to future). In bidirectional LSTM, instead of training a single model, the system utilizes two training models. The first model learns the sequence of the input provided, and the second model learns the reverse of that sequence.

An attention layer 422 takes these layers as input, for example using skip-connections. The attention layer 422 is a mechanism that can help a neural network to memorize long sequences of the information or data.

Subsequently, batch normalization and dense layers 426 and 430 are used. Batch normalization is a technique for training deep neural networks that standardizes the inputs to a layer for each mini-batch. This has the effect of stabilizing the learning process and dramatically reducing the number of training epochs required to train deep networks. Batch normalization is a technique to standardize the inputs to a network, applied to ether the activations of a prior layer or inputs directly. Batch normalization accelerates training, and provides some regularization, reducing generalization error.

The dense layer 430 may also referred to as a fully connected layer and is utilized in the final stages of the neural network. The dense layer 430 helps in changing the dimensionality of the output from the preceding layer so that the model can easily define the relationship between the values of the data in which the model is working. It should be noted that multiple batch layers 440, 448, 456, 464 and multiple dense layers 444, 452, 460, and 468 are created.

The rectified linear activation function or ReLU is used in dense layers, but a 'softmax' activation function in last dense layer 468. The ReLU is a piecewise linear function that outputs the input directly if it is positive, otherwise, it will output zero. The ReLU function does not activate all the neurons at the same time. The softmax function is a generalization of the logistic function to multiple dimensions. It is used in multinomial logistic regression and is often used as the last activation function of a neural network to normalize the output of a network to a probability distribution over predicted output classes.

This illustrated model was trained using categorical cross entropy loss, which is a loss function that is used in multi-class classification tasks. These are tasks where an example can only belong to one out of many possible categories, and the model must decide which one. Formally, it is designed to quantify the difference between two probability distributions.

Figure 4B:
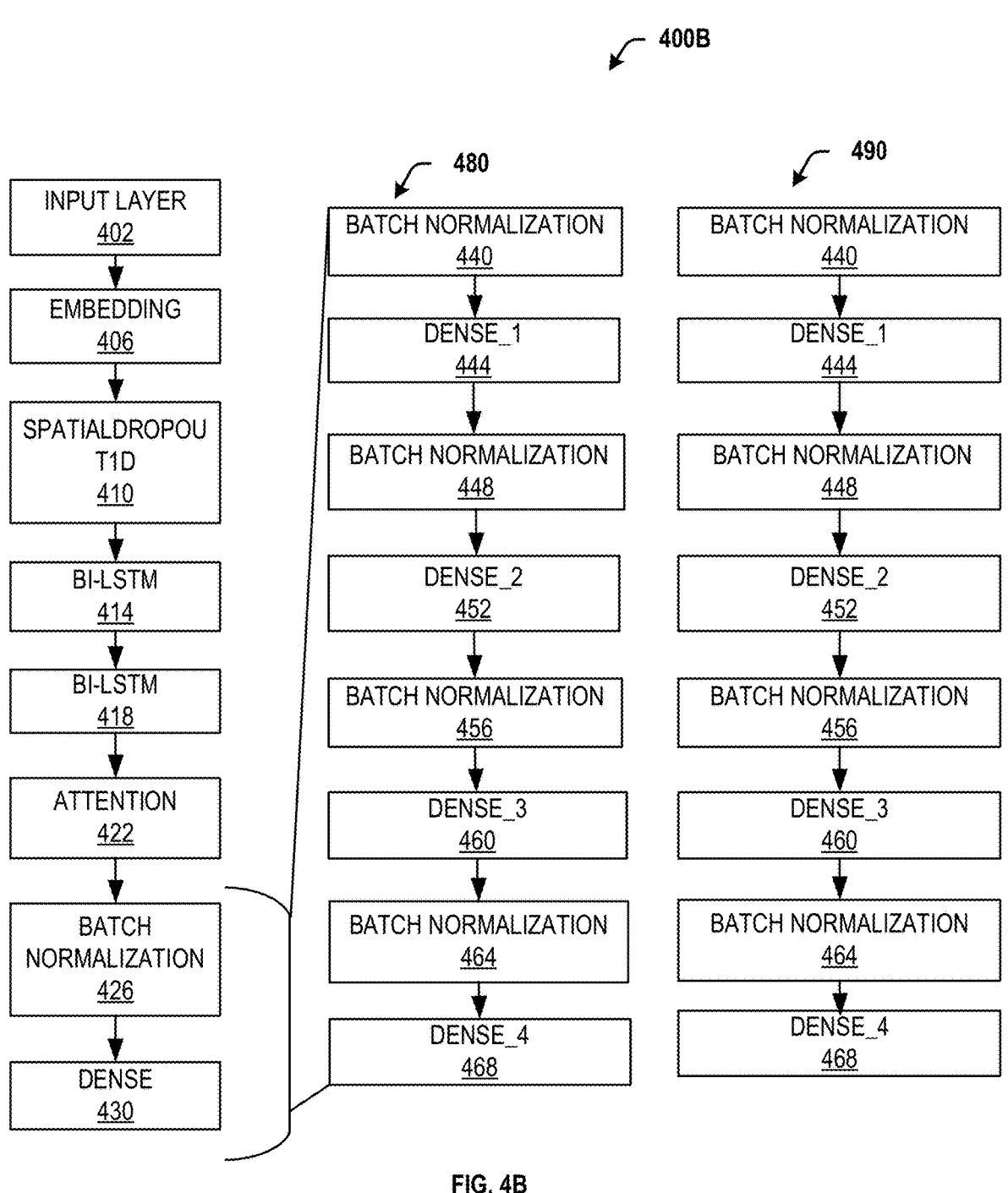

FIG. 4B illustrates an emotion classifier 400B having a similar structure to the sentiment classifier. The emotion classifier includes the input layer, embedding layer, 1D spatialdropout layer, bi-directional LSTM layers, attention layers, batch normalization layers and dense layers described herein. As set forth above, the emotion classifier 400B includes both positive and negative emotion models. The positive and negative emotion models have emotion labels and emotion strengths as targets. The emotion classifier 400B associates input conversational data with particular emotions and a specific strength. The emotion models uses normal activation functions that are used in last dense layer for classification and regression tasks respectively. The emotion model is trained using categorical cross entropy loss and mean square error loss for classification tasks 480 and regression tasks 490 respectively. The classification tasks 480 may classify the emotion as positive or negative in accordance with a specific identified emotion. Weights may be applied to the emotions through the regression tasks 490 in accordance with business requirements.

Figure 5:
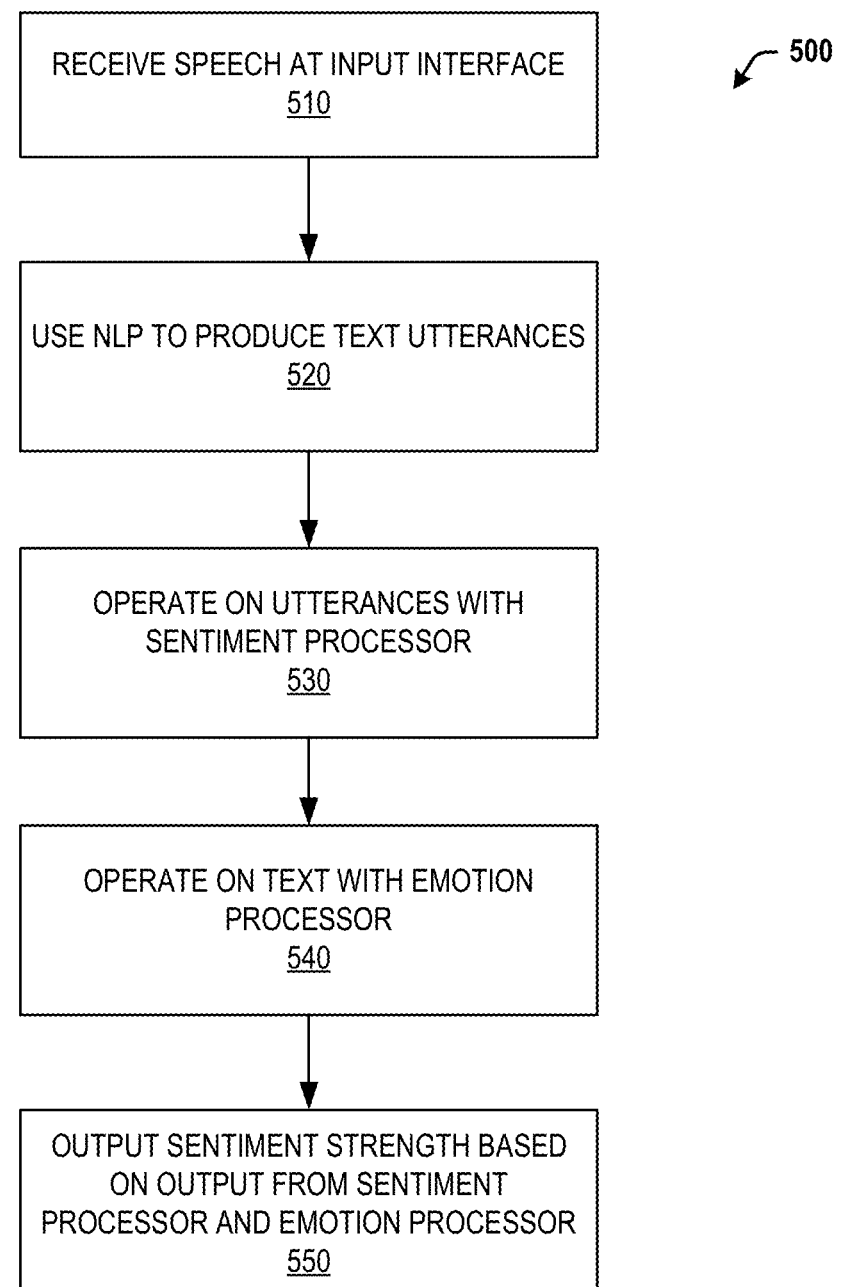
FIG. 5 is a flowchart illustrating a method for sentiment classification in accordance with at least one embodiment.

FIG. 5 is a flowchart illustrating a method for sentiment classification 500 in accordance with at least one embodiment. In step 510, input is received at the input interface of the sentiment classification system. The input may be or include audible speech, text chat, or other unstructured speech input. The input preferably collectively forms a conversation, which can be divided into a sequence of utterances.

In step 520, the natural language processor, such as that shown in FIG. 2, can be implemented to pre-process the received input. Pre-processing can take many forms. For example, the processing at step 520 may include speech-to-text conversion and further semantic processing on the converted text. The further processing can identify parts of speech and particular words for use in the subsequent analysis. Further, in some aspects, the speech may be also analyzed directly without being converted to text, to derive information from characteristics such as loudness, pitch, and speech rate. In this instance, both the speech and processed text are transferred to the sentiment classifier for analysis and quantification. Pre-processing may further include operating on text, for example, remove the following characters: |: , ; & !?. Preprocessing may further include converting to lowercase and stemming, to reduce word inflections and removing any tokens with a document frequency less than two, which reduces sparse features that are not informative for learning.

In step 530, the sentiment processor 240 operates on the pre-processed and/or unprocessed input to predict sentiment. As explained above, the sentiment processor 240 implements a neural network to predict positive, neutral, or negative sentiment for the input. The sentiment processor 240 also operates to direct this output to the emotion processor 250. As explained above, the emotion processor 250 includes a positive emotion trained model 340 and a negative emotion trained model 350. When the sentiment processor 240 predicts positive sentiment, the sentiment processor 240 forwards the output to the positive emotion trained model 340. When the sentiment processor 240 predicts negative sentiment, it forwards the output to the negative emotion trained model 350.

In step 540 the emotion processor 250 operates on the received output. In embodiments set forth herein, the emotion processor 250 uses the positive emotion trained model to predict positive emotion and strength of the positive emotion. The emotion processor 250 uses the negative emotion trained model 350 to predict negative emotion and strength. When the predicted sentiment from step 530 is neutral, the emotion processor 250 outputs a strength of zero and emotion of "neutral". In embodiments set forth herein, the emotion processor 250 classifies the emotion as positive or negative. Negative emotions that may be used in the model include fear, sadness, and anger. Positive emotions may include, for example, joy.

In step 550, the sentiment classification system 200 utilizes the output mechanism 260 to output a sentiment strength based on the output from the sentiment processor 240 and the emotion processor 250. In embodiments disclosed herein, the output is generated on a "per utterance" basis and therefore, sentiment over the course of a conversation can be tracked. Emotion strength and class may also be included in the output.

Figure 6:
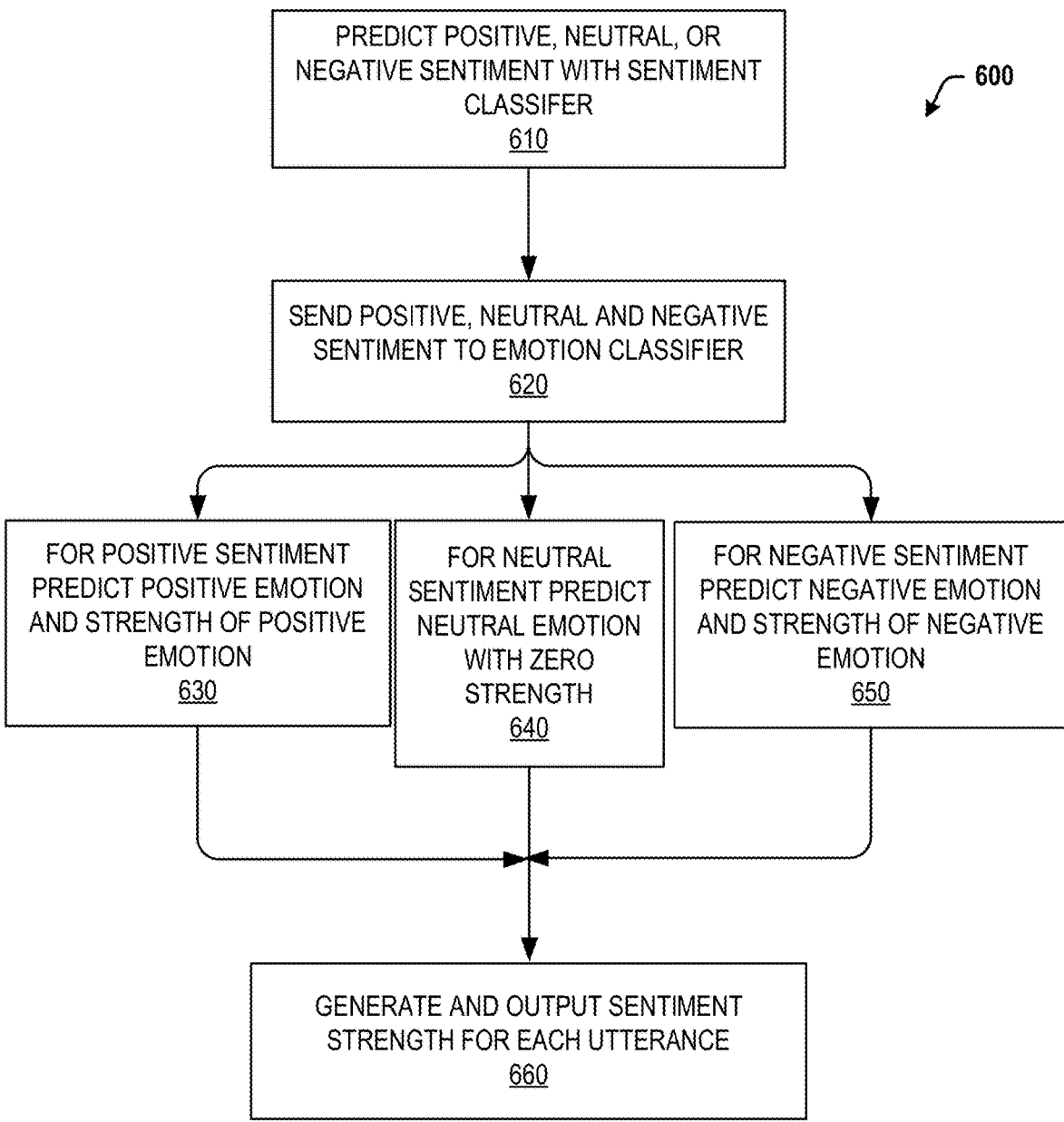
FIG. 6 is a flowchart further illustrating a method for sentiment classification in accordance with at least one embodiment.

FIG. 6 is a flowchart further illustrating a method 600 for sentiment classification in accordance with at least one embodiment. In step 610, the sentiment trained model of the sentiment processor 240 predicts positive, neutral, or negative sentiment. In step 620, the sentiment processor sends the prediction to the emotion processor 250.

In steps 630, 640, and 650, the emotion processor 250 generates output. For positive sentiment received from the sentiment processor 240, in step 630, the emotion processor

250 predicts positive emotion and the strength of the positive emotion utilizing the positive emotion trained model 340. For negative sentiment received from the sentiment processor 240, the negative emotion trained model 350 operates on the output to predict negative emotion and the strength of the native emotion at step 650. In step 640, the emotion processor 250 generates neutral emotion with a zero strength for neutral sentiment.

Finally, in step 650, the output mechanism 260 generates output sentiment strength for each utterance throughout a conversation. The final output can illustrate sentiment strength throughout the course of the conversation.

In the embodiments described above, sentiment and emotion flow may be described as follows:

```
Conversation = [U₁, U₂....Uᵢ....Uₙ]
ids = [ ]
Sentiment_flow = [ ]
Emotion_flow = [ ]
Emotion_weight_flow = [ ]
For Uᵢ in conversation:
    sentiment_class, emotion_class, emotion_weight = predict(Uᵢ)
    ids.append(i)
    sentiment-flow.append(sentiment_class)
    emotion_flow.append(emotion_class)
    emotion_weight_flow.append(emotion_weight)
```

In the above-illustrated flow, each utterance U is operated on by the illustrated sentiment classification system. The system quantifies chat and call analytics data into negative, positive, and neutral data by using a weighted rule for emotions deemed useful. In exemplary embodiments, the four emotions may be included in the positive and negative classes. Anger, fear and sadness may be in the negative class and joy may be in the positive class. Optimal weight factors may be utilized according to the nature of the data business requirements.

FIG. 7 is a graph 700 illustrating sentiment classification output in accordance with at least one embodiment. In the illustrated embodiment, a user-agent conversation is shown at 710 and corresponding sentiment strength output is shown at 720. The sentiment strength output 720 shows sentiment strength form negative 0.6 to positive 0.6 on the y-axis and utterances from 0 to 10 along the x-axis. Accordingly, the illustrated graph shows sentiment strength across all ten utterances composing the conversation. The illustrated conversation 710 is for a credit card domain client conversing with an agent. As illustrated, while the sentiment begins as very negative, it ends as positive and the sentiment classification system leads to the conclusion that the client is satisfied.

FIG. 8 is a graph 800 illustrating an alternative sentiment classification output in accordance with at least one embodiment. In the illustrated embodiment, a user-agent conversation is shown at 810 and corresponding sentiment strength output is shown at 820. The sentiment strength output 820 shows sentiment strength form negative 0.7 to positive 0.4 on the y-axis and utterances from 0 to 8 along the x-axis. Accordingly, the illustrated graph shows sentiment strength across all eight utterances. The illustrated dialogue 810 occurs between an agent and an investment domain client. Note that the sentiment strength for the user utterances is shown as negative and the sentiment classification system thus illustrates that the investment domain client as dissatisfied with the resolution. Thus, as a conversation includes a sequence of utterances, the sentiment classification system described herein provides the sentiment and emotion flow over the full conversation. This sentiment flow is further used for overall sentiment and quality of conversation.

Figure 9:
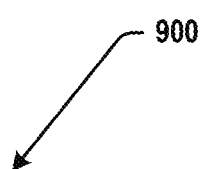
FIG. 9 is a table illustrating additional sentiment classification output in accordance with at least one embodiment.

FIG. 9 is a table illustrating additional sentiment classification output 900 in accordance with at least one embodiment. For a given input text or utterance, sentiment and emotion prediction based on the described model is illustrated. The original input text includes a single utterance, "I will sue you". The model described herein assesses the sentiment of the original text as "negative" and measures a sentiment magnitude as 0.64681286. The emotion classifier defines the emotion as being anger and as having the magnitude as set forth by the sentiment classification model. The emotion classifier also concludes that the other emotions, fear, joy, and sadness, are not included in the utterance.

The system as illustrated in the block diagrams and flowcharts of the above-described Figures includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, the system, and the computer program product, as described above, have numerous advantages. For example, embodiments of the invention enhance and simplifying sentiment classification thereby reducing resources required for assessment. Furthermore, embodiments of the invention serve to quantify metrics that have previously only been considered subjectively.

All of the components shown in the FIGS. above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

A person with ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc. The claims can encompass embodiments for hardware, software, or a combination thereof.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, and equivalent arrangements. [While particular embodiments of the invention have been illustrated and described in detail herein, it should be understood that various changes and modifications might be made to the invention without departing from the scope and intent of the invention.

What is claimed is:

1. A system comprising:
an input interface receiving conversational input from at least one system participant;

a natural language processor operating on the conversational input to produce pre-processed input;

a sentiment processor operating on the pre-processed input using a sentiment classification model to predict sentiment, the sentiment processor predicting positive, neutral, and negative sentiment for the pre-processed input and sending the corresponding predicted sentiment to an emotion processor;

the emotion processor receiving the pre-processed input from the natural language processor and the corresponding predicted sentiment from the sentiment processor, the emotion processor operating on the pre-processed input to predict an emotion class selected from an emotion class group comprising anger, fear, sadness, and joy and a strength of the emotion based on the corresponding predicted sentiment received from the sentiment processor, wherein:

on a condition that the predicted sentiment is positive, transmitting the predicted sentiment and the pre-processed input to a positive emotion trained model, the positive emotion trained model predicting a positive emotion as the emotion class and predicting a strength of the positive emotion based on the positive predicted sentiment and the pre-processed input; and on a condition that the predicted sentiment is negative, transmitting the predicted sentiment and the pre-processed input to a negative emotion trained model, the negative emotion trained model predicting a negative emotion as the emotion class and predicting a strength of the negative emotion based on the negative predicted sentiment and the pre-processed input; and an output mechanism generating sentiment strength for the conversational input based on the emotion class and strength of the emotion.

2. The system of claim 1, wherein the emotion processor outputs an emotion strength of zero when the corresponding predicted sentiment is neutral.

3. The system of claim 1, wherein the natural language processor groups the conversational input into utterances and provides the pre-processed input to the sentiment processor and the emotion processor grouped into separate utterances.

4. The system of claim 3, wherein each utterance is at least one word and has a maximum length.

5. The system of claim 4, wherein the natural language processor divides the utterance into multiple sentences when the utterance exceeds the maximum length.

6. The system of claim 1, wherein the emotion processor evaluates multiple classes of emotions.

7. The system of claim 1, wherein the output mechanism generates sentiment strength for multiple utterances through a dialog in order to dynamically generate a representation of the sentiment strength throughout the dialog.

8. The system of claim 1, wherein the sentiment classification model utilizes a deep learning architecture.

9. A method comprising:

receiving conversational input at an input interface from at least one system participant;

operating on the conversational input using a natural language processor to produce pre-processed input;

predicting sentiment using a sentiment processor operating on the pre-processed input, the sentiment processor using a sentiment classification model for predicting positive, neutral, and negative sentiment for the preprocessed input and sending a corresponding predicted sentiment to an emotion processor;

predicting an emotion and a strength of the emotion of the pre-processed input received from the natural language processor using the emotion processor receiving the pre-processed input from the natural language processor and the corresponding predicted sentiment from the sentiment processor, the emotion processor operating on the pre-processed input to predict an emotion class selected from an emotion class group comprising anger, fear, sadness, and joy, the emotion processor utilizing a positive emotion trained model when the corresponding predicted sentiment is positive, the positive emotion trained model predicting a positive emotion a strength of the positive emotion and the emotion processor utilizing a negative emotion trained model when the corresponding predicted sentiment is negative, the negative emotion trained model predicting a negative emotion and a strength of the negative emotion, wherein the predicted emotion is based on the predicted sentiment and the pre-processed input; and generating sentiment strength for the conversational input based on the emotion and strength of the emotion.

10. The method of claim 9, further comprising outputting a strength of zero when the corresponding predicted sentiment is neutral.

11. The method of claim 9, further comprising grouping the conversational input into utterances and providing the pre-processed input to the sentiment processor and the emotion processor grouped into separate utterances.

12. The method of claim 11, further comprising providing at least one word in each utterance and setting a maximum length per utterance.

13. The method of claim 12, further comprising dividing the utterance into multiple segments when the utterance exceeds the maximum length.

14. The method of claim 9, further comprising evaluating multiple classes of emotions.

15. The method of claim 9, further comprising dynamically generating a representation of the sentiment strength for each utterance throughout a dialog.

16. The method of claim 9, wherein the sentiment classification model utilizes a deep learning architecture.

17. A non-transitory computer readable medium storing instructions executed by one or more processors to perform operations comprising:

receiving speech input at an input interface from at least one system participant;

operating on the speech input using a natural language processor to produce pre-processed text;

receiving the pre-processed text from the natural language processor at a sentiment processor and an emotion processor;

predicting sentiment using the sentiment processor operating on the pre-processed text, the sentiment processor using a sentiment classification model predicting positive, neutral, and negative sentiment for the pre-processed text;

predicting an emotion and a strength of the emotion of the pre-processed text received from the natural language processor using an emotion processor receiving the pre-processed text from the natural language processor and a corresponding predicted sentiment from the sentiment processor, wherein:

the emotion processor utilizes a positive emotion trained model when the corresponding predicted sentiment is positive, the positive emotion trained model predicting a positive emotion a strength of the positive emotion based on the positive predicted sentiment and the pre-processed text;

the emotion processor utilizes a negative emotion trained model when the corresponding predicted sentiment is negative, the negative emotion trained model predicting a negative emotion and a strength of the negative emotion based on the negative predicted sentiment and the pre-processed text; and the emotion processor predicts, based on the predicted sentiment, an emotion class selected from an emotion class group comprising anger, fear, sadness, and joy; and generating sentiment strength for the pre-processed text based on the emotion and strength of the emotion.

18. The non-transitory computer readable medium of claim 17, the operations further comprising outputting a strength of zero when the corresponding predicted sentiment is neutral.

19. The non-transitory computer readable medium of claim 17, the operations, further comprising grouping the speech input into utterances and providing the pre-processed text to the sentiment processor and the emotion processor grouped into separate utterances.

20. The non-transitory computer readable medium of claim 19, the operations further comprising dynamically generating a representation of the sentiment strength for each utterance throughout a dialog.

* * * * *